Nov. 17, 1959   W. C. LIEFFERS ET AL   2,913,404
LIQUID-SOLIDS CONTACT SYSTEM
Filed Jan. 20. 1955   2 Sheets-Sheet 1
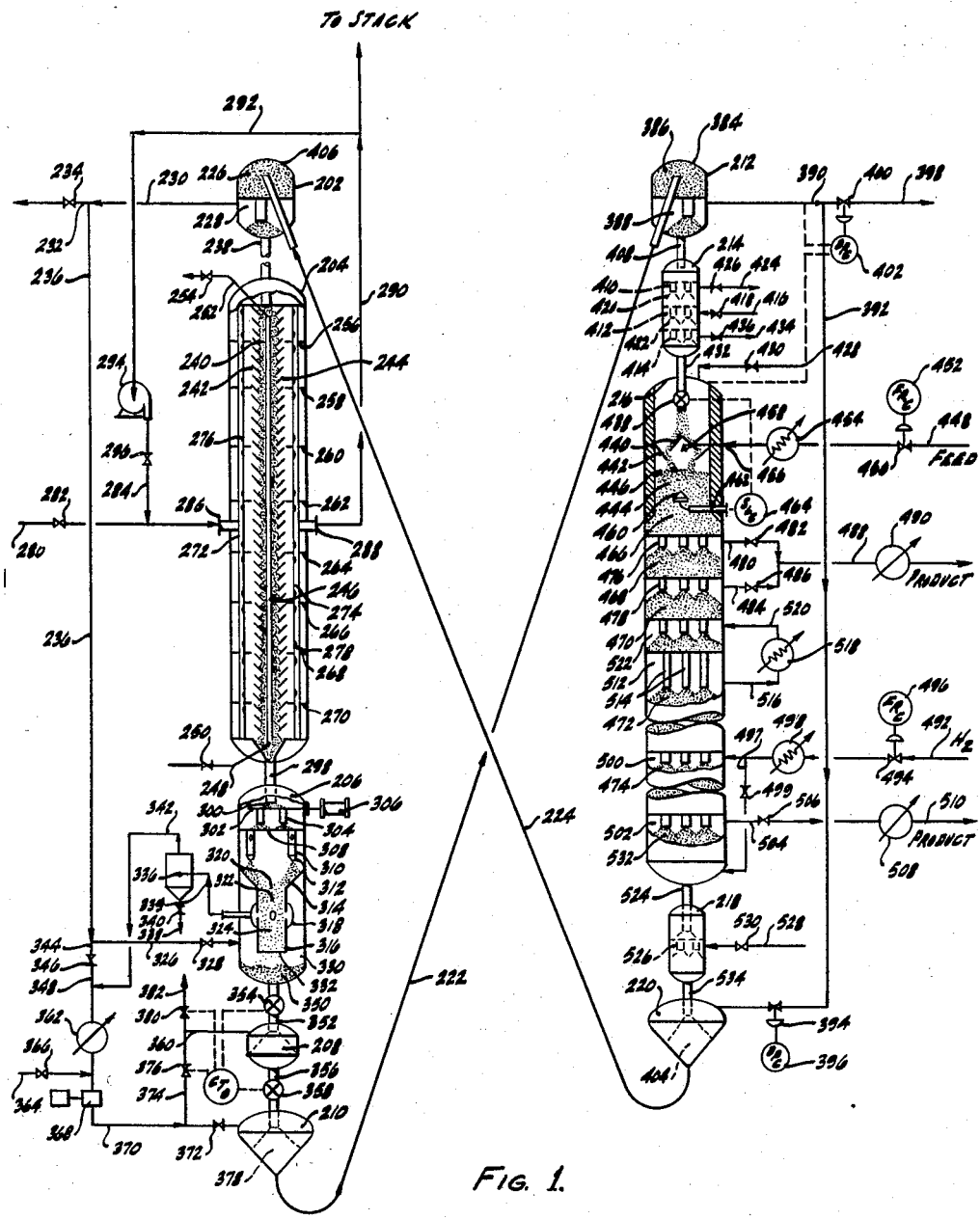
Fig. 1.
INVENTORS.
WILLIAM C. LIEFFERS,
FRANK C. RIDDICK, JR.,
ROBERT L. SWITZER,
BY
AGENT.

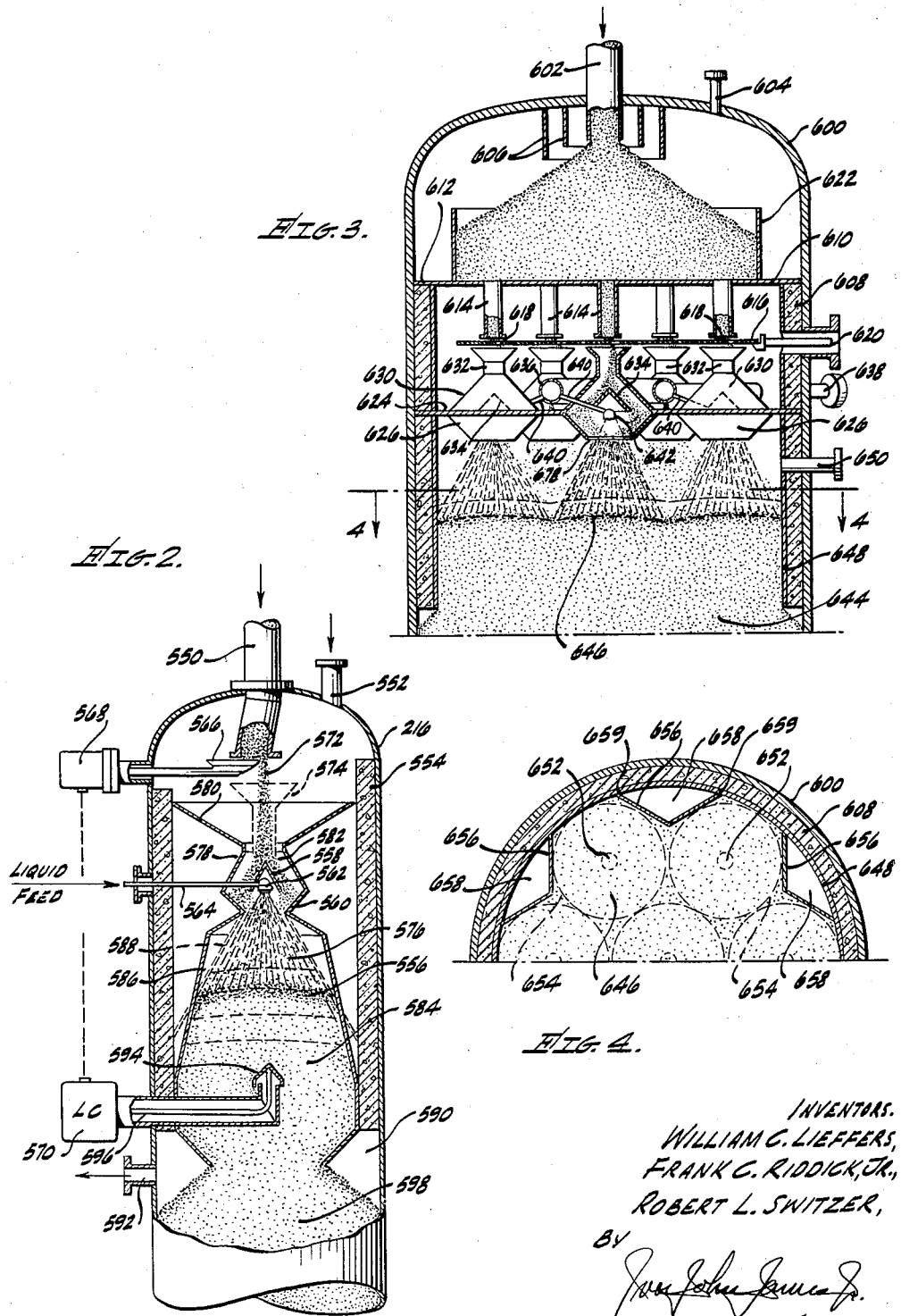

United States Patent Office 2,913,404
Patented Nov. 17, 1959

2,913,404

LIQUID-SOLIDS CONTACT SYSTEM

William C. Lieffers, Santa Ana, and Frank C. Riddick, Jr., and Robert L. Switzer, Long Beach, Calif., assignors to Union Oil Company of California, Los Angeles, Calif., a corporation of California Application January 20, 1955, Serial No. 482,991

12 Claims. (Cl. 208—166)

This invention relates to an improved process and apparatus for handling granular solids and in particular relates to the handling of granular solid materials in an improved solids-fluid contact system. Although there are many different kinds of solids fluid contacting processes which are presently affected on a large scale commercial basis in modern industrial operations, the non-catalytic and catalytic hydrocarbon conversion operations in which the hydrocarbon is brought into contact at conversion conditions of temperature, pressure, and composition for a variable reaction time in the presence of catalytic or noncatalytic solid granular contact material are probably typical. Most of these processes are carried out in the presence of solid contact material which is circulated by any suitable means through a series of contact zones including one or more reaction zones and at least one solids regeneration zone.

In such processes the control of the solids recirculation rate and of the indication and control of solids levels or solids inventory in the recirculating system have been exceedingly difficult. One particular phase of this problem involves the control of the rate of removal of granular solids from a given contacting column in that it has been difficult to maintain a uniform solids withdrawal pattern throughout the cross section of the column. A further problem which has only heretofore been partly solved involves the uniform contacting of the fluid with the granular solid contact material. The problem is relatively simple when gaseous fluids are being contacted, but with liquid feeds the problem is exceedingly difficult and no known solution to this problem has yet been devised whereby each granular solid particle may be contacted with a proportionate part of the total liquid feed. A still further problem which is characteristic of all recirculating solid-fluid contacting processes involves the efficient removal of solids fines from the circulated solids stream. There is invariably a small amount of solids fines present in the recirculated solids stream due to the fact that the solids move. The continuous separation of solids fines from a recirculating stream of solids has in the past been accomplished by elutriation of the solids by a fluid flowing at controlled velocity, but invariably some fine solids remained and some solids having average dimensions greater than those desirably removed were also removed with the fines.

The present invention therefore is directed to an improved solids-fluid contacting process of general application wherein substantially all of these problems are successfully avoided. Particularly this invention is directed to an improvement in those catalytic or non-catalytic hydrocarbon contact processes in which a liquid or partially vaporized hydrocarbon is brought into contact with a recirculating stream of solid granular contact material.

It is a particular object to provide in a solids fluid contacting process an improved procedure for introducing the fluid, either liquid or vapor, into contact with the granular solid contact material.

It is a specific object of this invention to provide an improved means for introducing a liquid into uniform contact with a flowing stream of granular solid contact material at the top of a solids-liquid contacting column.

It is an additional object to provide a means for introducing granular solids into the top of a solids-fluid contacting column so as to form therein a moving solids mass having a substantially flat upper surface or level onto which a liquid to be contacted is sprayed directly.

It is also an object of the present invention to provide an improved apparatus for effecting the foregoing objects.

Other objects and advantages of the present invention will become apparent to those skilled in the art as the description thereof proceeds.

Briefly the present invention comprises an improved process and apparatus for contacting a flowing stream of granular solid contact material uniformly with a fluid. More particularly this invention comprises an improved solids fluid contacting process and apparatus in which a granular solid contact material is recirculated through at least one contacting zone in contact with a liquid. A specific embodiment of the present invention is in the high temperature conversion of hydrocarbons wherein a hydrocarbon feed stock is introduced, at least partly in the liquid phase, into contact with the stream of granular solid contact material. Preferably this contact material comprises an adsorptive hydrocarbon conversion catalyst in contact with which the hydrocarbon, at least partly in the liquid phase, is reacted and converted to produce hydrocarbon products of higher volatility and lower boiling range. For example, this process is advantageously applied in the catalytic cracking and coking of gas-oil boiling range hydrocarbons to produce hydrocarbons boiling in the gasoline range.

The catalyst solids are introduced in a heated and regenerated condition into the top of a reaction zone, are distributed therein in a specific manner hereinafter more fully described, and are allowed to flow downwardly by gravity as a dense moving bed. The hydrocarbon to be converted is also introduced at the top of the reaction zone, at least partly in the liquid phase, and at a rate controlled relative to the catalyst rate so that the liquid is entirely held on the surface and in the pores of the individual solid particles by wetting and/or adsorptive forces. By so controlling the relative solids and fluid flow rates, there is no free liquid phase moving through the downwardly moving solids bed and the liquid hydrocarbon to be converted is carried downwardly through the reaction zone at the same velocity as, and by means of, the downwardly moving catalyst bed. However some of the same advantages are realized with wholly vapor phase feeds because of the flat upper surface of the solids bed. The solid material is of equal depth at all points and the customary fluid by-passing down the outer parts of the solids bed, induced by the conical upper surface normally present, is avoided. This is especially important with solids beds whose depths are between about 10% and 200% of their average diameters. With greater L/D ratios the effect is reduced.

The catalyst is introduced at an elevated temperature preferably somewhat higher than the reaction temperature but below a temperature at which the catalyst is thermally damaged. The hot catalyst supplies a substantial part of the heat required to bring the feed hydrocarbon to the reaction temperature, to vaporize the volatile reaction products from the moving solids stream, and to supply the heat of reaction. A part of the hydrocarbon feed often vaporizes immediately on contact with the hot solids while the remaining unvaporized liquid portion is retained as described on the solids. As the solids pass downwardly through the reaction zone, further volatile products are formed and are vaporized from the solids. The vapors as formed are swept rapidly from the reaction zone by maintaining a flow of sweep gas such as hydrogen through the interconnected interstices of the downwardly moving bed. The sweep gas rate is controlled at a high rate so that the volatile products are removed without any substantial further reaction. To accomplish this desired result, the sweep gas may be introduced at a plurality of points and the sweep gas and volatile products may be removed from a plurality of different points along the length of the reaction zone.

One of the key steps in the process of this invention is in the novel liquid-solid contact which has been found to result in the practically complete uniformity of treatment of all the solid particles with the liquid, and at the same time prevents any substantial quantity of the liquid from contacting the internal surfaces of the reaction vessel whereby the usual accumulation of coke on such surfaces is completely eliminated. This liquid-solid contacting step is effected by passing the liquid hydrocarbon feed into and through at least one downwardly directed solid cone spray, that is, a spray of liquid in which there is substantially constant concentration of liquid throughout the entire transverse cross section of the spray at any distance from the spray source. The hot regenerated solid contact material is simultaneously passed downwardly by gravity into a solids deflecting zone over a series of specially designed baffles disposed above and around the spray which is located at a central point in the deflecting zone. The solids are directed downwardly and laterally through the spray to form the aforementioned substantially flat solids bed within the reaction zone. The solid particles are contacted with the liquid discharging from the spray during their downward and lateral passage therethrough and additionally by impingement of the sprayed liquid directly onto the flat solids bed.

The walls of the reaction zone may be made to conform to the general conical shape of the spray, that is a conical vessel may be employed, or a conical internal baffle may be disposed surrounding the spray within the vessel and into which the solids bed having the flat upper surface is maintained. In this way liquid impingement against the walls is prevented because the area of the solids bed is always substantially equal to the spray area at the point of impingement.

In a cylindrical reaction zone however, the position of the flat solids level is preferably controlled relative to the spray so that the upper area of the flat solids bed coincides with or is slightly in excess of the area of the spray at that distance from the spray head itself. Under such conditions the liquid spray impinges against substantially all of the flat upper solids surface and does not impinge against the reaction zone walls. These considerations in active cooperation with the lateral and downward trajectory of the individual granular solids through the spray have been found during extensive experimental testing to provide a substantially uniform contact of each solids particle with its proportionate share of liquid.

The baffles briefly referred to above for directing the solid particles through the spray into a flat bed are coaxially aligned and are conical or pyramidal in shape. For sake of clarity they are referred to hereinafter as cones and their shape is defined in terms of this apex angle. This angle in a pyramid is that of a cone whose height and base areas are identical to those of the pyramid. A primary and a secondary baffle are employed. The primary or inner baffle has the geometric shape of either a cone or a pyramid with three or more sides, and with the apex upwardly centrally located below each inlet for granular solids particles. The apex angle may be between about 60° and 120° with 90° angles found to be satisfactory. The conical liquid spray is disposed directly below and substantially coaxially aligned with the vertical apex of this primary baffle. The spray is directed downwardly along the same axis as that passing through the solids inlet and the primary baffle. Surrounding the lower periphery of the primary baffle is a secondary baffle having the shape of an inverted truncated cone or a truncated pyramid with three or more sides. It is disposed slightly below the lower periphery of the primary baffle a sufficient distance so that lines drawn from the apex along the surface of the primary baffle intersect the inner surface of the secondary baffle at a low point thereon. The apex angle of the secondary baffle is such that the solids from the primary baffle are directed downwardly and inwardly from the secondary baffle. The apex angle sufficient to achieve this result is equal to 180° less the primary apex angle less between about 5°–30° and preferably about 15°. For a 90° primary apex angle, a satisfactory secondary apex angle is about 75°. The liquid spray discharges downwardly from below the primary baffle through the lower opening of the secondary truncated baffle.

These baffles are rigidly supported in the relative positions described by any suitable mechanical means and preferably from the inner walls of the reaction vessel. A stream of solid material to be contacted is passed downwardly by gravity onto the apex of the primary baffle, is deflected thereby downwardly and laterally outward against the inner surface of the secondary baffle, and is then redeflected by the secondary baffle downwardly and inwardly in all directions through the conical liquid spray. In this manner each solid particle contacts liquid particles ejected from the spray and the particles are discharged into the reaction zone to form a moving bed of solid particles having a substantially flat upper surface. The cross sectional area of the solids bed is controlled so as to have substantially the same area as that of the spray impinging against it by either of the means indicated.

In one modification of the process of the present invention, the position of this flat solids level is regulated in a cylindrical contacting zone so as to substantially coincide with the position therein at which the outermost liquid particles in the spray would otherwise impinge against the internal walls of the reaction zone. In another modification of an inner reaction zone baffle of generally truncated conical shape, having its imaginary apex upward and an included angle substantially equal to that of the spray, is disposed surrounding the liquid spray. In this construction, the area of the upper surface of the flat solids bed is substantially the same as the cross sectional area of the spray at any given distance from the spray head. Changes in solids level result in changing the length of the reaction zone and the reaction time independently of solids flow rate changes. In another modification adapted to larger feed rates, plural sprays manifolded together are geometrically arranged throughout the cross section of a large diameter reaction zone to provide for substantially uniform contacting of the flat solids bed therein. A hexagonal arrangement around a central spray for example is desirable, and if necessary several concentric circular rows of spray heads may be employed in hexagonal or other geometric arrangements. In this plural spray modification the solids level is controlled to a position substantially at which the adjacent sprays converge. Thus all solids on the flat surface are impacted by the spray. In any case employing plural spray heads, each head is provided with the above described primary and secondary baffles having either conical or pyramid shapes so as to direct the granular solids into the form of a flat bed after passing downwardly and laterally through the sprays.

It will be seen that in any of these modifications, the area of the flat solids bed and the cross-sectional area of the conical liquid spray coincide in equal values at the points of contact.

In combination with the above solids fluid distributing system a step is employed for controlling the rate of introduction or the rate of removal of solids to or from the reaction zone respectively. In addition it is possible to employ funnel shaped solids guides disposed coaxially above each primary baffle and below an individual source of solid contact material. It is also permissible to interconnect mechanically by suitable means the primary and secondary baffles with the optional funnel shaped solids guide referred to above to provide a substantially closed solids flow path downwardly through and around the spray heads.

Although the present invention is adapted to general application in almost any process in which it is desirable to contact granular solids with a liquid in the absence of a net liquid flow through the bed of solids, such as in the impregnation of catalyst carriers with catalytic impregnating solutions and other similar contacting processes, the invention is most advantageously applied to the contacting of granular solid contacting material such as catalysts with at least a partially liquid stream to be converted in the presence of such solid catalyst. Accordingly the following description of one application of the process of this invention will be conducted in terms of the catalytic cracking of hydrocarbon oils of relatively high boiling range to produce substantial quantities of lower boiling hydrocarbon products and without the production of the heavy refractory cycle stocks characteristic of the hydrocarbon conversion processes of the prior art.

The invention and its application in hydrocarbon conversion processes will be more readily understood by reference to the accompanying drawings in which:

Figure 1 is a schematic flow diagram in partial cross section of a catalytic cracking and coking process and apparatus for treating heavy liquid hydrocarbons, and Figures 2, 3, and 4 are elevation views in cross section showing the details of several modifications of the solids-liquid contacting apparatus of this invention which may be substituted in the apparatus of Figure 1.

Referring now more particularly to Figure 1, a schematic flow diagram of the present invention is shown in which granular solids are recirculated through two contacting columns and in which the structural details of the individual apparatus structures are shown. Figure 1 will be described in terms of the treatment of a hydrocarbon feed stock, at least partially in the liquid phase, boiling above about 400° F. with a catalytic cracking catalyst in the presence of hydrogen to produce a cracked and coked hydrocarbon product consisting substantially entirely of gasoline and lighter hydrocarbons.

The apparatus of the present invention includes first solids fluid separator 202, catalyst regeneration vessel 204, regenerated solids feeder and elutriation vessel 206, solids pressuring vessel 208 and first induction vessel 210. The foregoing elements comprise a series of superimposed vessels constituting one of the columns of the present invention. The second column comprises second solids-fluid separator vessel 212, upper sealing vessel 214, reaction vessel 216, lower sealing vessel 218 and second induction vessel 220. The bottom of the first contacting column is connected to the top of the second contacting column by means of first conveyance conduit 222. Second conveyance conduit 224 communicates the bottom of the second contacting column with the top of the first contacting column to complete the closed cyclic solids path.

In the present example the solid granular contact material comprises a silica alumina synthetic bead cracking catalyst containing between 0.1% and 0.2% of chromium oxide by weight to facilitate spent catalyst regeneration. The circulation rate in the present example is 800 pounds per hour. The feed rate is 8.6 barrels per day of a gas oil fraction including 5.7 barrels per day of recycle oil boiling above 400° F. and 2.9 barrels per day of fresh gas oil feed having the following properties:

TABLE 1

*Properties of fresh feed stock*

Boiling range, °F _____ 550–760 (90% pt.)
Gravity, °API _____ 23.5
Sulfur weight percent _____ 1.15
Characterization factor _____ 11.5

The catalyst to oil ratio on a weight basis is 6.5 to 1.

The spent catalyst containing about 0.50% by weight of a hydrocarbonaceous deactivating deposit generally referred to as coke is discharged as a compact moving bed from second conveyance zone 224 into first solids separator 202. The spent solids bed 226 passes downwardly by gravity through fluid disengaging zone 228 from which the totally depressured conveyance fluid is removed at a pressure of 350 p.s.i.g. through line 230. A portion thereof may be removed if desired through line 232 controlled by valve 234. The remaining portion of conveyance fluid, which comprises an inert flue gas is recirculated in the conveyance fluid recycle stream through line 236.

The spent granular solids pass downwardly through transfer line 238 for introduction into the upper part of catalyst regenerator 204. The spent catalyst passes downwardly therethrough as moving bed 240 confined between louvered walls 242 and 244, the louvers sloping downwardly and inwardly confining the catalyst therebetween and providing a low resistance transverse flow path for the regeneration fluid. Extending longitudinally through the downwardly moving bed of spent catalyst is heat exchange zone 246 through which a fluid heat transfer medium is passed at a rate sufficient to maintain the maximum temperature of regeneration at values well below those at which the catalyst is thermally damaged. The heat transfer medium may be gaseous or liquid, and if gaseous it may be passed either concurrently with or countercurrently to the downwardly moving solids bed. If liquid, it is preferred that it be introduced in line 248 controlled by valve 250 for upward passage through heat transfer zone 246 and removal through line 252 controlled by valve 254. In the present example the cooling medium was low pressure steam passed through the regeneration zone so that the maximum temperature was successfully maintained at about 1150° F.

The spaces on either side of the downwardly moving bed 240 of spent cracking catalyst comprise an inlet and outlet manifold zone for the regeneration fluid. This space is subdivided into a plurality of superimposed inlet and outlet manifold zones by means of a series of vertically spaced horizontal baffles 256, 258, 260, 262, 264, 266, 268 and 270. In the present structure, the louvered walls 242 and 244 extend substantially entirely across vessel 204 along lines paralleling the diameter of the column. Extending upwardly through column 204 on each side of the louvered walls are inlet and outlet header zones 272 and 274 respectively adapted to introduce and remove the regeneration fluid from regenerator vessel 204. These header zones in the present example comprise an elongated conduit closed at its ends and provided with one or more apertures 276 and 278 respectively by means of which the fluid passes from inlet header 272 into each of the inlet manifold zones, transversely through the downwardly moving catalyst bed 240, into the corresponding outlet manifold zone, and then into outlet header 274.

Fresh regeneration fluid consisting of air is introduced at a rate of 1000 s.c.f./hr. through line 280 controlled by valve 282 and is mixed with an optional recirculation of spent regeneration gas flowing through line 284. This regeneration gas is introduced through inlet 286 into inlet manifold 272, is collected in outlet manifold 274, and removed therefrom through outlet 288 and through line 290 to a stack. If desired a portion of this spent regeneration gas may be recirculated through line 292 by means of blower 294 and line 284 controlled by valve 296 for recirculation with the fresh regeneration fluid into the inlet 286 of the regenerator column 204.

The regenerated catalyst is removed from regenerator 204 at a temperature of about 950° F. containing approximately 0.05% coke by weight. It is conducted downwardly as a moving bed through transfer line 298 and is introduced into the top of regenerated catalyst feeder and elutriation vessel 206.

Vessel 206 is roughly divided into two portions, the upper portion containing especially designed catalyst feeding or metering device containing a surge volume, and a lower catalyst elutriation device for effecting the continuous separation of a very small quantity of catalyst fines from the recirculating catalyst stream. The catalyst feeding and surge device cooperates actively with the elutriation section and provides for the latter section a continuous metered stream of solids at a constant predetermined volumetric rate from an intermittently flowing source of regenerated solids.

Transfer line 298 extends downwardly into the upper part of vessel 206 and terminates in outlet opening 300. Disposed transversely in the upper part of vessel 206 is reciprocable solids feeder tray 302 with a pair of open ended dependent tubes 304 extending downwardly therefrom. These are the feeder tubes having a known volume and defining the volumetric capacity of the solids feeder. Motive means 306 is provided for reciprocating tray 302 so as to align alternately one or the other of feeder tubes 304 with opening 300 of solids transfer line 298. Disposed immediately below feeder tubes 304 is a lower stationary tray 308 from which depend a plurality of surge tubes 310. These surge tubes are provided at their lower outlet openings with a solids flow restriction 312 which reduces the gravity discharge rate of the tubes to between about 1% and 30% of their normal gravity flow rate. Motive means 306 and reciprocating tray 302 alternately align one of the feeder tubes with opening 300 while sealing the lower opening of the same feeder tube against the upper surface of tray 308. At this same time the other feeder tube is aligned with one of the surge tubes thereby discharging its solid contents into the surge tube. Reciprocation of tray 302 intermittently removes incremental volumes of solids from opening 300 and discharges them into surge tubes 310. Because of the outlet restrictions 312, which may be made variable by means of any sort of a variable area orifice structure, a continuous discharge of solids from surge tube 310 is provided at an instantaneous rate which is equal to the average rate at which the feeder tubes charge solids thereto.

The solids discharging from surge tubes 310 pass downwardly and are directed by means of funnel or other appropriate member 314 into the upper portion of an elutriation chamber 316 having an intermediate disengaging means 318 for the removal of suspended solids fines in the elutriation gas. Between disengaging zone 318 and the upper solids inlet 320 is disposed a section of elutriation conduit 316 which is a solids acceleration zone 322 in which the granular solids are allowed to accelerate so that the larger particles attain at least a substantial part of their terminal velocity under the influence of gravity alone and in the absence of any simultaneous flow of fluids. The effect thus achieved has been found to include the substantially complete elimination of larger than desired sized particles in the elutriation gas suspension of fines. This is apparently due to the fact that the solids of undesirable size reach their terminal velocity very rapidly whereas the larger sized particles require an appreciable acceleration time. When the unaccelerated solids are dropped into an elutriation zone and a countercurrent flow of elutriation fluid is maintained, that fluid will suspend and remove the fine solids of low velocity as well as larger solids whose velocity is low because the solid has not accelerated to attain a substantial part of its terminal velocity.

In the present invention the solids are allowed to gravitate through acceleration zone 322 to form a shower having a density of the order of from 0.5% to 30% by weight of the maximum density in pounds per cubic foot of the dense packed solids when at rest. The substantially fully accelerated solids then pass downwardly into elutriation zone 324 in which they are contacted by a countercurrent flow of elutriation gas introduced through line 326 controlled by valve 328 into elutriation gas engaging zone 330 surrounding elutriation and acceleration conduit 316. This gas passes upwardly through lower outlet 332, decelerating and suspending the finer sized solids, and decelerate but not sufficient to suspend the larger solids which move substantially at their terminal velocity. The suspension of solids fines is removed from conduit 316 through disengaging zone 318 and flows through line 334 into separator 336 in which a centrifugal or other appropriate separation of the suspended solids fines is effected. The solids fines are removed through line 338 controlled by valve 340 and the fines free elutriation fluid is removed through line 342.

In the present instance the elutriation conduit 316 was 24 inches long, 2.0 inches in inside diameter, and the disengaging point was located 10 inches from the upper inlet opening of conduit 316. This was sufficient under the conditions of operation to permit the largest sized particles to attain at least 50% of their terminal velocity. Without the acceleration zone 322 the fine solids smaller than 20 mesh were contaminated with as much as 25% of larger sized solids which were not desirably removed. However with the acceleration zone, the fine solids are found to contain less than about 1% of the larger solids desired in the recirculating solids stream.

In the present application of the process of this invention the elutriation fluid comprises spent regeneration gas at 950° F. introduced into the elutriation zone through lines 236 and 326 at a rate of 1000 s.c.f./hr. The remaining spent regeneration gas flows on through line 344 controlled by valve 346 which provides a pressure differential sufficient to force the elutriation fluid through the elutriation zone. The fines free elutriation fluid and the remaining portion of conveyance fluid recycle are joined in line 348 and treated as subsequently described. The elutriated fines free catalyst collects as a solids bed 350 in the bottom of feeder and elutriation vessel 208. These solids exist at a pressure of about 350 p.s.i.g. and are to be delivered to reaction column 216 at a pressure of about 400 p.s.i.g.

To accomplish this, one or more solids pressuring vessels 208 are provided in solids receiving relation to solids bed 350 and in solids delivery relation to first induction vessel 210. Transfer line 352 controlled by valve 354 provides a solids inlet to vessel 208 and line 356 controlled by valve 358 provides a solids outlet therefrom into induction vessel 210. With pressure vessel 208 at a pressure of 350 p.s.i.g. valve 354 is opened and a charge of solids passes by gravity through line 352 into vessel 208. Valve 354 is then closed, and a fluid under pressure is admitted through manifold 360 raising the pressure of the fluids in the interstices of the solids in vessel 208 to a pressure of 450 p.s.i.g. In the present modification this fluid comprises compressed flue gas as part of the conveyance fluid recycle. This conveyance fluid is cooled if necessary in cooler 362, is mixed with additional conveyance fluid if necessary flowing through lines 364 controlled by valve 366, is compressed to a pressure of 450 p.s.i.g. in conveyance fluid recycle compressor 368, and is introduced through line 370 controlled by valve 372 into the high pressure point of the conveyance fluid path according to this invention. A part of this high pressure fluid flows through line 374 controlled by valve 376 and through manifold 360 as the high-pressure catalyst pressuring fluid.

With the catalyst pressured to 450 p.s.i.g., valve 376 is closed, valve 358 is opened and the pressured solids discharge into and are added to solids accumulation 378 in first induction chamber 210. Valve 358 is then closed, valve 380 is opened for a sufficient period to vent pressuring vessel 208 through lines 260 and 382 to a pressure of 350 p.s.i.g. At this time valve 354 is reopened to admit sufficient solids to be pressured and the cycle is repeated at a rate sufficient to pressure the regenerated catalyst at a rate equal to that at which catalyst is withdrawn by means of the reciprocating tray feeder described above.

The 450 p.s.i.g. conveyance fluid and solids are depressured concurrently through first conveyance zone 222 in the form of a dense upwardly moving bed of compact solids. The solids discharge against the upper surface 384 of second solids-fluid separator chamber 212 and pass downwardly as a moving bed 386 through conveyance fluid disengaging zone 388. The over-all pressure differential in conveyance zone 222 is about 50 p.s.i. and accordingly the conveyance fluid pressure in zone 388 is about 400 p.s.i.g. The major portion of the conveyance fluid is removed through line 390, passed through by-pass line 392 at a rate controlled by valve 394 in accordance with differential pressure controller 396, and is introduced at substantially the same pressure into second induction vessel 220. If desired, a minor portion of the conveyance fluid is removed from line 390 through line 398 at a rate controlled by valve 400 in accordance with differential pressure recorder controller 402 and either discarded or returned through line 364 to conveyance gas compressor 368. The major portion of conveyance fluid engages with spent catalyst 404 which is depressed concurrently as an upwardly moving compact mass through second conveyance conduit 224 and discharged against upper surface 406 of first solids-fluid separator chamber 202 to complete the catalyst and conveyance fluid cycle.

The hot regenerated catalyst passing downwardly as moving bed 386 flows through transfer line 408 into upper seal vessel 214. Herein a special mechanism and process for isolating the conveyance fluid flow from the hydrocarbon fluids in reaction vessel 216 are employed. Regenerated hydrocarbon cracking catalyst is exceedingly sensitive to the deactivating effects of steam. Steam is desirable as a sealing medium because of its ease of separation from hydrocarbon fluids through cooling and condensing steps and its relative cheapness. In the present invention steam may be employed with substantially no deleterious deactivating effects in upper sealing vessel 214. This vessel is provided with upper disengaging zone 410, steam engaging zone 412, and lower disengaging zone 414. Seal steam is introduced through line 416 controlled by valve 418 into engaging zone 412 wherein it divides into a first portion which passes upwardly countercurrently to the regenerated catalyst through a small catalyst bed 420 into upper disengaging zone 410, and a second portion which passes downwardly concurrently through small catalyst bed 422 into lower disengaging zone 414. The first portion combines with a minor portion of conveyance fluid flowing concurrently with the catalyst through transfer line 416 and is removed therefrom via line 424 controlled by valve 426. The second portion of steam joins in lower disengaging zone 414 with a portion of a blanket stream of hydrogen introduced through line 428 at a rate of 500 s.c.f./hr. controlled by valve 430 and which flows upwardly countercurrently to the catalyst through transfer line 432. This lower seal stream is removed through line 434 controlled by valve 436.

Zones 410, 412, and 414 are placed as close together as possible, preferably with not more than a few inches of clearance therebetween in which catalyst beds 420 and 422 exist. In this way a very small amount of seal steam serves to prevent intermixing of the conveyance fluid with the hydrogen and yet the catalyst is in contact in vessel 214 with steam for only an exceedingly short period of time. In the present invention this time is about 50 seconds and results in no detectable deactivation of the catalyst. The regenerated catalyst, sealed and stripped of conveyance fluid as above described, drops by gravity through transfer line 432 at a rate controlled by valve 438 into the top of reaction vessel 216 for downward passage therethrough in contact with the hydrocarbon to be converted.

Reaction vessel 216 is of special design to provide for a completely uniform contacting of the entering regenerated catalyst with the hydrocarbon feed. The structural details of several modifications of the solids-liquid contacting means are subsequently described in connection with Figures 2, 3, and 4. The relative catalyst and feed rates are controlled so that no downwardly flowing liquid phase of hydrocarbon exists through the downwardly moving catalyst bed. The catalyst bed is maintained at hydrocarbon conversion conditions of pressure, temperature, and composition to effect a catalytic cracking of the adsorbed liquid hydrocarbon in the presence of a flow of hydrogen to produce hydrocarbons of lower molecular weight and having boiling points of below 400° F. These higher volatility hydrocarbons are evolved into the vapor phase from the catalyst bed at any point where they are formed and are swept rapidly, without any further substantial reaction, from the reaction zones by means of a current of hydrogen. The catalyst flow is continued and the reaction temperature is maintained so that at the bottom of the column the spent catalyst contains only a deposit of coke in which the carbon to hydrogen ratio is very high, of the order of 20 to 1. The residence time of the catalyst in the reactor, the operating pressure, and the operating temperature are thus controlled so as to convert substantially all of the adsorbed liquid hydrocarbon feed into volatile products boiling below about 400° F. and a relatively minor portion of high molecular weight deactivating deposit on the catalyst.

The sealed, regenerated catalyst passes downwardly concurrently with a blanket stream of hydrogen onto inner or primary conical baffle 440 deflecting the catalyst outwardly and downwardly against the inner surface of outer or secondary truncated conical baffle 442. The catalyst is deflected then downwardly to form the downwardly moving catalyst bed 444 which passes completely through reaction vessel 216. The purpose of the two conical distributing baffles 440 and 442, having the shape and relative disposition shown, is to form and maintain a substantially flat upper solids surface 446 on which the partially preheated feed hydrocarbon, at least partly in the liquid phase, is sprayed.

The gas-oil feed is pumped through line 448 at a rate of 8.6 barrels per day controlled by valve 450 in accordance with flow recorder controller 452. The oil is heated to a temperature of about 400° F. in preheater 454 and is then passed through inlet 456 provided with a spray head 458 which is directed downwardly from a point immediately below upper conical baffle 440. The downwardly directed spray is so disposed that the catalyst deflected from the lower truncated conical baffle 442 passes in various directions through the solid cone spray and catalyst level 446 is so controlled that the upper exposed area of the catalyst bed is substantially equal to and preferably slightly greater than the cross-sectional area of the solid cone feed spray at the point where the spray contacts upper catalyst level 446.

It has been found that the relative disposition of baffles 440 and 442 and head spray 458 results in the contacting of every single regenerated catalyst particle with a substantially uniform quantity of liquid hydrocarbon feed which in turn results in uniform treatment of the feed and of the catalyst at all times.

The position of solids level 446, which also indicates the inventory of catalyst in the system, is detected by a submerged solids level indicating element 460 disposed below solids level 446 and actuated by the gravitational and frictional forces of the downwardly moving catalyst bed 444. These forces are determined by the depth of catalyst bed above element 460. It is connected by means of mechanical linkage 462 to solids level controller 464 which in turn actuates solids inlet valve 438 to maintain the solids level 446 at the desired distance below the feed inlet sprays. The conventional solids level indicators which detect the position of the upper solids level 446 with an element penetrating the solids level cannot be used in the present type of process since exposed metal surfaces tend to accumulate a heavy deposit of coke which soon renders inoperable such detecting elements. The improved submerged element 460 serves to detect changes in solids bed level of up to about 1.5 feet in a column 1.5 feet in diameter using a detector element 3 inches in diameter. This detecting element thus can detect solids level changes about equal to the column diameter with an element whose diameter is one-sixth of that diameter. It does not accumulate the hydrocarbon deposit, and is capable of long continued operation.

The catalyst at a temperature of 1050° F. passes through line 432 as described. An initial vaporization of the more volatile components of the feed takes place at solids level 446 and this vapor, together with any vapor fraction of the feed as introduced, passes downwardly through first reaction zone 460 concurrently with the downwardly moving bed of catalyst containing the liquid fraction of the feed adsorbed thereon. The vapor phase flow is concurrent with the major portion of blanket hydrogen introduced as described through line 428.

The moving bed of cracking catalyst containing the adsorbed liquid phase hydrocarbon passes downwardly through first reaction zone 466 concurrently with the mixture of blanket hydrogen and the vapor phase hydrocarbon. During the downward passage continuing reaction of the liquid phase hydrocarbon causes the evolution of additional volatile hydrocarbons which join the vapor phase. A plurality of subjacent serially connected reaction zones are provided for the continued reaction of the adsorbed phase hydrocarbon. In Figure 1 these additional reaction zones are indicated as second reaction zone 468, third reaction zone 470, fourth reaction zone 472, and fifth reaction zone 474. The first, second, and third reaction zones are separated from one another by first and second effluent disengaging zones 476 and 478 from which the volatile hydrocarbons in the vapor phase and the hydrogen recycle stream are withdrawn through lines 480 controlled by valve 482 and line 484 controlled by valve 486. If desired any greater number of concurrent reaction zones similar to zones 466 and 468 may be employed and in each case provision is made for the disengaging of the hydrocarbon vapor from the solids and for the removal of such material to prevent further reaction. The vapor so removed is passed through line 488 into product cooler 490 in which it is passed into a conventional vapor liquid separator. The liquid is sent to storage or further processing facilities not shown and the vapor phase is fractionated to recover light hydrocarbons leaving a hydrogen rich gas which is recirculated to the reactor as the hydrogen sweep gas and blanket gas introduced thereto.

The principal portion of this hydrogen is introduced as the sweep gas into the lower part of the reactor through line 492 at a rate of 1500 s.c.f./hr. controlled by valve 494 in accordance with flow recorder controller 496. The hydrogen is heated to a temperature of 1100° F. in heater 498 and is passed through hydrogen sweep gas engaging zone 500 into contact with the downwardly moving catalyst bed. A first portion of this hydrogen sweep gas passes upwardly countercurrent to the downflowing catalyst in fourth reaction zone 472, while the second portion passes downward concurrently with the catalyst in fifth reaction zone 474. This second portion and the finally evolved hydrocarbon vapors are disengaged from the catalyst in disengaging zone 502 and are removed therefrom through line 504 controlled by valve 506 to be cooled and partially condensed in cooler 508. A third part of this sweep gas is introduced as a spent catalyst purge gas at the bottom of the reactor via line 497 controlled by valve 499. It passes upwardly to outlet 502. The cooled effluent is passed through line 510 to vapor liquid separating facilities similar to those described. If desired, all of the effluents removed from lines 480, 484, 504 and any others when used may be combined for simultaneous treatment, or each or any combination thereof may be handled separately.

The first portion of sweep hydrogen passes upwardly countercurrent to the catalyst into interheater disengaging zone 512 which is provided with a plurality of relatively long internal sealing legs 514 of restricted cross-sectional area. A minor portion of this hydrogen passes upwardly through sealing legs 514, generates a pressure differential in flowing therethrough which forces the major portion to flow through line 514 into interheater 518 and then back through line 520 into interheater engaging zone 522. Because of the vaporization and desorption of high volatility hydrocarbon from the downwardly moving catalyst and because of the endothermic heat of reaction, the temperature of the catalyst decreases as it passes downwardly through reaction column 216 from zone to zone. During passage of hydrocarbon and hydrogen through interheater 518, it is heated from about 950° F. to about 1100° F. to supply heat to the catalyst passing downwardly from zone 470. One or more of such interheating zones may be employed in a given column, but in any event their structure and operation are analogous to those described immediately above.

The spent deactivated cracking catalyst containing as high as 12–15% carbon by weight is discharged from the bottom of reactor column 216 through outlet line 524 into lower seal vessel 218 provided with steam engaging zone 526. Since the deactivated catalyst is unaffected by steam, the structure of upper seal vessel 214 is not required at this point. A first part of the steam introduced through line 528 at a rate controlled by valve 530, passes upwardly countercurrent to the catalyst, strips residual volatile hydrocarbons in lower stripping zone 532, and is removed with the lower product through line 504. The second part of this stripping steam flows concurrently with the spent catalyst downwardly through line 534 into second induction vessel 220 wherefrom it is conveyed as described before through second conveyance conduit 324 into first solids-fluid disengaging separator 202.

In the event that the reactor is to be operated at a lower pressure than the regenerator, the solids pressuring vessel 208 and its associated equipment is disposed below the reactor in line 524 or 532 and operated as above described.

In the experimental verification of the process of this invention using the reaction and regeneration conditions outlined above with the feed stock defined in Table 1 it was found that an 85% by volume conversion of the feed stock to a gasoline product boiling below about 400° F. may be obtained. The physical properties of the product are as follows:

TABLE 2

*Reactor product characteristics*

| | |
|---|---|
| Gravity, °API | 50 |
| Boiling range, °F. | 120–410 |
| Weight percent sulfur | 0.3 |
| Knock ratings: | |
| F–1 clear | 86.0 |
| F–1+3 | 93.0 |

In a modification of the above described hydro-conversion process, the synthetic bead cracking catalyst is impregnated with a substantial amount of chromium, such as between about 10% and about 15% by weight. This catalyst, besides having cracking activity, also actively promotes the hydrocracking of the higher molecular weight hydrocarbons.

With a completely liquid feed and a synthetic bead cracking catalyst, the minimum weight ratio of catalyst to oil is about 8.0 under the control conditions previously defined. Usually however feed preheating and/or the pressure of vaporizable constituents in the feed permit this ratio to be reduced to as low as about 5.0 and still maintain the liquid hydrocarbon in the conversion zone entirely on the surface and/or in the pores of the solid contact material.

Referring now more particularly to Figure 2, an enlarged detail drawing in cross section is shown of the upper portion of reactor column 216 of Figure 1. In Figure 2 column 216 is provided with solids inlet conduit 550 opening into the top thereof. The column is internally insulated by means of insulation 554 which extends downwardly from the top of the column to a point below the variable solids level 556. Primary baffle 558 and secondary baffle 560 are disposed above and below solid cone spray head 562. The liquid feed is introduced through conduit 564 and is discharged downwardly in the form of a solid cone spray into the reaction zone. The rate of solids introduction is controlled by means of valve 566, which in the present modification comprises a slide valve actuated by operator means 568 in accordance with solids level controller 570 as hereinafter described. The stream of granular solids passes downwardly as shown at 572 through an optional funnel guide 574 and is directed downwardly onto primary baffle 558. It deflects the solids downwardly and outwardly against secondary baffle 560, and the solids redirected thereby pass inwardly and downwardly as a shower indicated generally as 576 to form a bed of solids 584 having a flat upper surface 556. Primary baffle 558 is supported in the position shown by means of a spider or other suitable physical connection not shown.

Primary and secondary baffles 558 and 560 are the essential baffle elements in the apparatus of this invention. An additional outer or tertiary baffle 578 may be superimposed upon and integrally connected to secondary baffle 560 and operated in conjunction with an upper funnel shaped baffle 580 so as to provide a confined course 582 for the solid contact material downwardly and around primary baffle 558 and then into and through the downwardly directed solid cone spray.

The above described apparatus can be employed to generate and maintain a bed of solids having a flat surface in a cylindrical vessel and wherein the solids level is controlled so as to coincide with the area of the spray. However, a preferred modification of this invention includes another inner baffle 586 having a general conical shape and disposed immediately below secondary baffle 560 and it further confines the solids. One particularly desirable modification involves such an inner baffle 588 shown by broken lines having the shape of a truncated cone of included angle substantially identical to that of the conical feed spray and integrally connected at its upper end to the lower periphery of secondary baffle 560. With this modification the position of solids level 556 may be raised or lowered to other positions in reaction zone 584 as indicated by the transverse broken lines and at all positions the cone spray impinges against substantially the entire upper area of the solids level.

The liquid fraction of the feed is taken up on the surface and in the pores of the granular solids and is carried thereby downwardly through reaction zone 584 into and through first product disengaging zone 590. Herein the initially vaporized portion of the feed and the vaporized reaction products produced in first reaction zone 584 are disengaged therefrom through outlet 592 together with at least a portion of the sweep gas which passes downwardly concurrently with the granular solids into the reaction zone. The rate of solids introduction is controlled by valve 566 which is actuated by solids level controller 570 in accordance with the gravitational and frictional forces exerted against detector element 594. This element is completely submerged within the solids bed and is not exposed to direct contact with the incoming liquid feed. The forces acting thereon are proportional to the height of solids level 556 above element 594 and these forces are transmitted by means of actuator rod 596 into level controller 570. In this manner the solids level 556 is maintained at any desired position. The granular solids continue downwardly through subsequent reaction zones indicated generally as 598 for further reaction, the general details of such reaction zones having been previously described in connection with Figure 1.

Referring now more particularly to Figure 3 a detailed elevation in partial cross section is shown of an apparatus adapted to liquid-solids contacting at high commercial rates. Contacting or reaction vessel 600 is provided at its upper end with solids inlet 602 and sweep gas inlet 604. Several radiation shields 606 surround the solids inlet. As in the previous description internal insulation 608 is provided vessel 600 throughout the interval including the solids fluid contacting zone.

An upper transverse tray 610 is provided onto which the granular contact material is discharged. One or more openings 612 are provided through tray 610 to permit sweep gas or other fluid passage therethrough so as to avoid interference with the granular solids flow rate through solids downcomers 614. Solids downcomers 614 are arranged in a uniform geometric pattern on upper tray 610 and preferably in rows, are open at both ends, and are of equal lengths. Extending along each row of solids downcomers and immediately adjacent the lower extremities thereof is solids flow control plate or strip 616 having apertures 618 therein which are alignable with the lower opening of the downcomers by adjustment of tray 616 by means such as a hydraulic cylinder, etc. not shown but connected therewith by arm 620. The hopper 622 is "flooded" with solids at all times. The rate of solids introduction thereto is controlled by the setting of plate 616 which controls the area opened by alignment of apertures 618 with the downcomers and thereby controls the rate of solids removal in a plurality of separate streams for downward passage into the deflecting and fluid contacting system of this invention.

Disposed somewhat below the flow control tray 616 is lower tray 624. Extending downwardly from tray 624 and arranged in the same geometric pattern as downcomers 614 is a plurality of secondary inverted truncated conical or pyramidal baffles 626, from the lower outlet openings 678 of which are discharged the granular solids and the liquid in the form of a solid cone spray. Superimposed on lower tray 624 is a plurality of tertiary baffles 630 which have the shape of a truncated cone or pyramid with apex upward, and integrally attached at their base to the upper periphery of secondary baffles 626. In this structure the tertiary baffles 630 are provided with solids funnel guides 632 integrally attached to the upper end of each tertiary baffle. The upper inlet openings of guides 632 are coaxially aligned one each with the lower outlet openings of solids downcomers 614 at points immediately below the flow control tray 616. Supported by a spider or other suitable structure not shown, primary baffles 634 are centrally disposed within the chamber formed by the integrally attached secondary baffle 626 and tertiary baffles 630. A ring manifold 636 is supported above lower tray 624 and extends around through the free space around tertiary baffles 630. An inlet conduit 638 opening thereinto is provided and a feeder conduit 640 extends from manifold 636 through baffles 630 and 634 to each spray head 642. Preferably the feeder conduits are protected from direct contact with the solids flowing downwardly between primary baffle 634 and tertiary baffle 630 and this may be done by a supporting spider from the primary baffle 634 in the form of three pieces of angle iron with their open edges downward and integrally connected to the primary and tertiary baffles. The feeder conduit may conventionally be run immediately below one of these angle iron connectors.

The granular solids discharge downwardly in a plurality of seven streams in the modification shown to be deflected and redeflected by the primary and secondary baffles to form a downwardly moving bed 644 having a substantially flat solids level 646 as before. The position of solids level 646 is controlled as above described so that none of the solid cone spray impinges against inner wall 648 and substantially all of the area of solids level 646 receives a direct liquid spray. Conduit 650 is provided for the removal or introduction of fluids from a point immediately adjacent the solids fluid contact point. Sweep gas can be added at this point.

In Figure 4 a transverse one-half plan view in cross section of the structure shown in Figure 3 is shown including contacting vessel 690, internal insulation 608, and inner walls 648. As herein indicated, a plurality of seven sprays and seven complete solids deflecting and mixing systems are employed and arranged in the geometric form of a hexagon. Numeral 652 indicates generally the common vertical axis of each system of solids downcomers 614, upper solids guide funnel 632, and the primary, secondary, and tertiary baffles 634, 626, and 630 respectively. Numeral 654 indicates generally the circular area on the solids level 646 within which the solids are contacted directly by the solid cone spray. If desired these circular patterns can be designed to overlap slightly so as to decrease the area between the circular patterns 654 in which less direct liquid impingement occurs. A solid hexagonal pyramid spray is highly advantageous, but has a tendency to wear out into a conical spray.

A plurality of vertical angular baffles 656 are disposed with their open edges 659 integrally attached to the inner surface of inner walls 648 and their common edges extending vertically between adjacent circular patterns 654. These vertical baffles extend downwardly from the approximate position of lower tray 624 to a position well below solids level 646. An open space 658 is thus provided between these baffles and inner wall 648 within which no granular solids are allowed to enter thereby reducing the cross sectional area of upper solids level 646 to one which is substantially completely contacted at all points by the solid cone sprays. The fact that less direct impingement of liquid from the solid cone sprays occurs against the solids in the relatively small area of solids level 646 outside the circular areas 654 is relative immaterial because these areas receive liquid impregnated solid granules which have passed laterally and downwardly through the solids cone spray. By reducing these areas to minimal values by arranging the sprays in a uniform geometric pattern and by the use of vertical angle baffles 656, the granular solids have been found to be uniformly contacted with a uniform quantity of fluid.

The efficiency with which the process and apparatus of the present invention operates in the uniform contacting of granular solid contact material with liquids has been ascertained in pilot studies in which deeply colored liquids consisting of dyed water solutions were injected as a solid cone spray through a downwardly flowing stream of solids deflected on the primary and secondary baffles as above described. The solids consisted of new 4–8 mesh synthetic bead cracking catalyst. Optical analysis of the resulting colored beads indicated that better than 99.8% of the granular solid particles were contacted with liquid to a uniformity to ±10%, that is, each granular particle was contacted with and retained an amount of liquid which was within ±10% of the quantity of liquid adsorbed by the other solid particles. In pilot plant studies of the present invention it was found that substantially the same degree of uniformity and efficiency of contacts were obtained in the treatment of gas oil with the same granular solid material.

The foregoing description given in terms of a specific solids-fluid contacting process in which the present invention has been applied should not be construed as a limitation of the process to the specific temperature and pressure conditions, feed stock, or granular solid contact material described. Although the invention is highly efficient in the conversion of gas oil boiling range hydrocarbons to gasoline boiling range hydrocarbons, the invention has general applicability in the treatment of liquid feeds generally with adsorptive contact material to produce an effluent having a lower boiling range. For example heavy gasolines may be converted to light gasolines boiling below about 300° F. for example, or to even lighter solvents, or to the liquefiable hydrocarbons including propane and butane. The present invention is also applicable under lower pressure conditions to the direct treatment of crude or reduced crude to produce kerosene, gas oils, gas oil fractions suitable for producing jet fuels, diesel fuels, and the like, as well as lighter materials such as light gas oils, the heavy and light gasolines, and the propane and butane fractions.

The present invention has been described with reference to hydrocarbon cracking and coking in the presence of hydrogen. By using a modified catalyst or a physical mixture of two catalysts, simultaneous hydrocarbon conversion processes such as desulfurization, reforming denitrogenation, and others may be carried on together with the dehydrogenation and cracking process described above.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. In a hydrocarbon conversion process wherein a hydrocarbon feed is contacted at least partially in the liquid phase with a granular solid contact material under conversion conditions, the improved method for obtaining uniform contact of liquid feed with said solid contact material, which comprises introducing the hot liquid feed to be contacted as a solid cone spray directed downwardly from a central point within a contacting zone, introducing a freely falling stream of granular solid contact material into a deflection zone surrounding said central point, deflecting said solids first downwardly and outwardly at an included angle of divergence between about 60° and 120° around said central point by impact with a baffle surface in the absence of a solids bed, and then redeflecting said solids downwardly and inwardly at an included angle of convergence equal to 180° minus said angle of divergence minus between about 5° and 30° by impact against a lower second baffle surface in the absence of a solids bed so as to create a dispersed shower of solids moving laterally into and through said spray, and collecting said solids in said contacting zone below said second baffle surface as a downwardly moving bed which has a substantially flat upper surface formed by passage of said solids through said deflection zone, said flat upper surface being substantially coextensive in area with the cross sectional area of said contacting zone and against substantially the entire area of which said spray impinges, all the solids admitted to said contacting zone being introduced via the deflection means specified in this claim.

2. A method according to claim 1 in combination with the steps of controlling the relative flow rates of said solids and said liquid so that the liquid phase remaining after contact with said solids is entirely retained by said solids and is carried downwardly thereby through said contacting zone so that the existence of a downward flow of liquid through said solids bed is prevented.

3. A method according to claim 1 wherein the substantial coincidence of said spray against said flat solids surface is maintained by the step of controlling the vertical position of said substantially flat solids level in said contacting zone at a position such that its upper surface area substantially coincides with the transverse area of said solid cone spray at that position.

4. A method according to claim 1 in combination with the steps of passing a sweep fluid downwardly concurrent with said solids and said spray into and through said downwardly moving bed to a subjacent fluid disengaging zone, and disengaging therefrom at least part of said sweep fluid together with vapor phase materials resulting from fluid introduction and solids contact therewith.

5. A method according to claim 1 wherein said contacting zone is provided with a transverse area which increases with distance below said central point at substantially the same rate as the transverse area of said spray increases, said contacting zone area being slightly greater than the area of said spray at a given distance from said central point whereby substantially no fluid impingement against internal contacting zone surfaces occurs and the area of said spray and the area of said solids bed substantially coincide therein.

6. A method according to claim 1 in combination with a plurality of said deflection zones uniformly distributed throughout a transverse cross section of said contacting zone, and the steps of introducing an individual stream of solids and introducing an individual stream of liquid into each of said deflection zones.

7. A method according to claim 6 in combination with the step of controlling the position of the substantially flat solids level below said central points at a position where the adjacent solid cone sprays converge so that the total transverse area of said sprays on contact with said solids bed is substantially equal to that of said bed.

8. A method for contacting a hydrocarbon with a solid granular hydrocarbon conversion catalyst which comprises introducing for conversion a hydrocarbon feed at least partly in the liquid phase into a central point within a conversion zone, directing said hydrocarbon downwardly from said point in the form of a solid cone spray into the top of said contacting zone, introducing a freely falling stream of said catalyst downwardly by gravity into a solids deflection zone surrounding said central point, therein deflecting said catalyst stream first downwardly and outwardly at an included angle of divergence between about 60° and 120° around said central point by impact with a baffle surface in the absence of a solids bed, and then redeflecting said catalyst stream downwardly and inwardly at an included angle of convergence equal to 180° minus said angle of divergence minus between about 5° and 30° by impact against a lower second baffle surface in the absence of a solids bed so as to create a dispersed shower of said catalyst granules moving laterally into and through said spray, forming therebelow a bed of catalyst solids having a substantially flat upper surface which is substantially coextensive with the cross sectional area of said contacting zone, controlling the position of said solids level so that said spray impinges against substantially the entire area of the flat solids level and substantially no other surfaces, maintaining hydrocarbon conversion conditions of pressure and temperature in said conversion zone to produce more volatile conversion products, passing a sweep gas concurrently through said spray and through at least the upper part of said catalyst bed to sweep said products therethrough without any substantial further conversion, and removing at least part of said products and said sweep gas from a subjacent disengaging zone, all of the catalyst solids admitted to said contacting zone being introduced via the deflection means specified in this claim.

9. A method according to claim 8 wherein said catalyst is an adsorptive hydrocarbon cracking catalyst, and said sweep gas comprises hydrogen.

10. A method according to claim 8 in combination with a plurality of said deflection zones distributed uniformly throughout the cross section at the top of said conversion zone, each supplied with separate streams of said hydrocarbon conversion catalyst.

11. An apparatus for solids-fluid contacting which comprises a vessel, a solids inlet conduit at the top and a solids outlet conduit from the bottom thereof, a downwardly directed solid cone spray head disposed at a central point within said vessel below said solids inlet, a primary conical baffle having its apex upwardly aligned with and disposed just above said spray head, a secondary inverted truncated conical baffle with imaginary apex downwardly spaced apart from and around the lower periphery of said primary baffle and disposed relative to the position of said spray head so that fluid therefrom passes downwardly entirely through the lower opening of said secondary baffle, a tertiary truncated baffle with imaginary apex upwardly disposed superimposed on said secondary baffle, a funnel guide for solids disposed above said tertiary truncated baffle in solids-receiving relation to said solids inlet, said baffles so disposed being adapted to receive solids from said solids inlet as a freely falling stream and to deflect and redeflect the solids from said solids inlet by impact on the baffle surfaces to form a shower of dispersed particles falling laterally into the conical spray zone directly below said spray head and ultimately forming a dense solids bed having a flat upper surface, and a liquid feed conduit opening into said vessel and into said spray head, said primary baffle having an included apex angle $\alpha$ of between about 60° and about 120°, and said secondary baffle having an included apex angle which is equal to 180° minus $\alpha$° minus between about 5° and about 30°.

12. An apparatus according to claim 11 in combination with a plurality of said coaxially aligned primary and secondary baffles and spray heads, in combination with means disposed at the top of said vessel adapted to receive solids from said solids inlet conduit and to direct a plurality of substantially equal individual solids streams downwardly one each onto each of said primary baffles.

References Cited in the file of this patent

UNITED STATES PATENTS

| | | |
|---|---|---|
| 2,458,162 | Hagerbaumer | Jan. 4, 1949 |
| 2,534,859 | Evans | Dec. 19, 1950 |
| 2,556,198 | Lassiat | June 12, 1951 |
| 2,574,489 | Lassiat et al. | Nov. 13, 1951 |
| 2,574,503 | Simpson | Nov. 13, 1951 |
| 2,574,850 | Utterback et al. | Nov. 13, 1951 |
| 2,593,495 | Shimp | Apr. 22, 1952 |
| 2,766,187 | Bergstrom | Oct. 9, 1956 |
| 2,766,189 | Shimp | Oct. 9, 1956 |
| 2,776,876 | Bowles et al. | Jan. 8, 1957 |
| 2,786,801 | McKinley et al. | Mar. 26, 1957 |
| 2,853,438 | Berg | Sept. 23, 1958 |